United States Patent
Kuramoto et al.

[15] 3,675,558
[45] July 11, 1972

[54] OPTICAL SYSTEM FOR A SINGLE LENS REFLEX CAMERA

[72] Inventors: Yoshio Kuramoto, Sakai-shi; Shotaro Inagaki, Okazaki-shi, both of Japan

[73] Assignee: Minolta Camera Kabushiki Kaisha, Osaka, Japan

[22] Filed: Oct. 10, 1969

[21] Appl. No.: 865,453

[30] Foreign Application Priority Data

Oct. 19, 1968 Japan..................................43/91391

[52] U.S. Cl....................................95/42, 95/11 V, 95/44 R
[51] Int. Cl. ..........................................................G03b 19/12
[58] Field of Search.........................................95/11 V, 42, 44

[56] References Cited

UNITED STATES PATENTS

| | | | |
|---|---|---|---|
| 3,174,416 | 3/1965 | Heer Klotz | 95/44 R |
| 3,250,196 | 5/1966 | Ort et al. | 95/44 R |

FOREIGN PATENTS OR APPLICATIONS

| | | | |
|---|---|---|---|
| 593,267 | 5/1959 | Italy | 95/11 V |
| 936,964 | 9/1963 | Great Britain | 95/11 V |

*Primary Examiner*—Samuel S. Matthews
*Assistant Examiner*—E. M. Bero
*Attorney*—Watson, Cole, Grindle & Watson

[57] ABSTRACT

A single lens reflex camera in which an external scale for adjusting the focus or shutter of a camera is visible with the object image in a viewfinder. Between the scale and a viewfinder there are provided a pentagonal prism and a convergent lens for forming a real image of the scale at the viewfinder eyepiece.

2 Claims, 5 Drawing Figures

IMPROVED OPTICAL SYSTEM FOR A SINGLE LENS REFLEX CAMERA

BACKGROUND OF THE INVENTION

In a single lens reflex camera, wherein the exposure adjustment scales such as the diaphragm scale, shutter speed scale, etc. as well as objective images are visible in a viewfinder and the camera operator, while looking through the viewfinder, can focus the objective for an object and view, the exposure adjustment scales on an exposure setting member such as a diaphragm setting ring or shutter speed setting ring into the viewfinder. However, as compared with an arrangement provided with a separate scale, such an arrangement has no need of an interlocking mechanism for both scales or operational mechanism for the other scale, so that it is advantageous in simplifying the structure of the camera. In the arrangement in the prior art such as shown in FIG. 1, the optical path length of the scale image and the objective image are not equal to each other, so that the visibility adjustment of the scale and object image is difficult.

SUMMARY OF THE INVENTION

The present invention relates to a single lens reflex camera, and more particularly to an improvement in a device for viewing the exposure setting scale in the viewfinder using a pentagonal prism and is characterized in that the exposure adjusting scales graduated on an exposure adjusting member are projected into the pentagonal prism and an optical system for forming images is disposed in the path of the incident light rays so as to allow real images of the scales to form images from the eyepiece approximately equal to the optical path length from the focusing plate to the eyepiece.

The primary object of the present invention is to provide a single lens reflex camera in which the optical path length in a viewfinder optical system of the exposure element scale image is approximately equal to the optical path length of the object image and thus when viewing these images through an eyepiece the visibility adjustment is easy and it is possible to view both images clearly at the same time.

The second object of the present invention is to provide apparatus to adjust the size of image of the exposure element scale shown in the finder through the same optical system for forming an image thereof.

The third object of the present invention is to provide a single lens reflex camera in which the visibility adjustment for the image of the frame surrounding the exposure element scale image is easy and when viewing the finder the objective image, the exposure element scale image, and the frame image thereof can be viewed clearly at the same time.

DESCRIPTION OF THE PREFERRED EMBODIMENT

Figure 1:
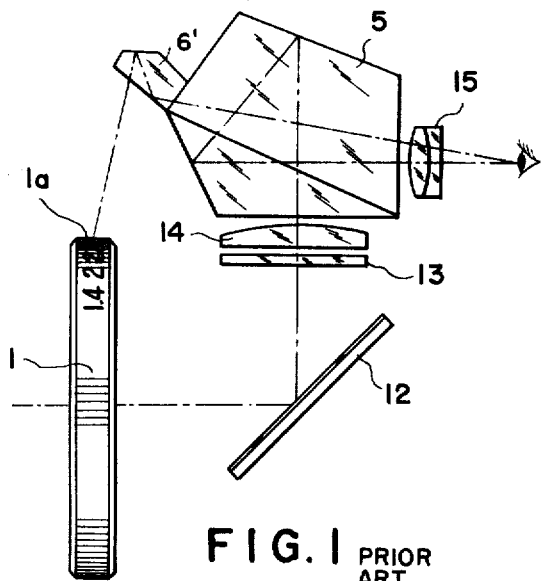
FIG. 1 is a side view showing an optical system for propagating the exposure element scale in a well known exposure setting member in the prior art into a pentagonal prism in a single lens reflex camera.
Figure 2:
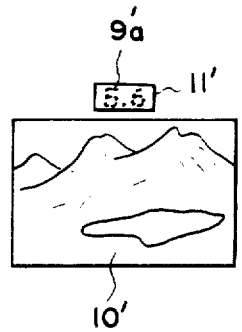
FIG. 2 is a front view of a viewfinder field of the same well known embodiment.

With reference to FIG. 1, in projecting the exposure adjusting scale on a well known exposure adjusting member in the prior art to a pentagonal prism in a single lens reflex camera, the exposure adjusting member, for example, diaphragm adjusting ring 1 turns substantially at a fixed position relative to the lens barrel projecting from a camera, so that the diaphragm scale 1a on ring 1 is projecting to pentagonal prism 5 of the viewfinder on the camera body through small prism 6'. The optical path length to eyepiece 15 is constant, so it is difficult to change the length thereof. Further, the light rays projected from an objective lens not shown in the drawings form an image on focusing plate 13 by means of reflector 12. The image on focusing plate 13 is projected to pentagonal prism 5 through condenser lens 14 and reflected by the inside surface thereof to reach eyepiece 15, so that the optical path length of the image in the viewfinder is also constant. And, from the view point of the construction of a camera, it is almost impossible to design so that the optical path length between diaphragm setting ring 1a and eyepiece 15 may be equal. For this reason, when viewing the viewfinder as far as the visibility adjustment is not given it is impossible to see clearly the diaphragm scale image 9a' shown in FIG. 2 together with objective image 10' at the same time.

Figure 3:
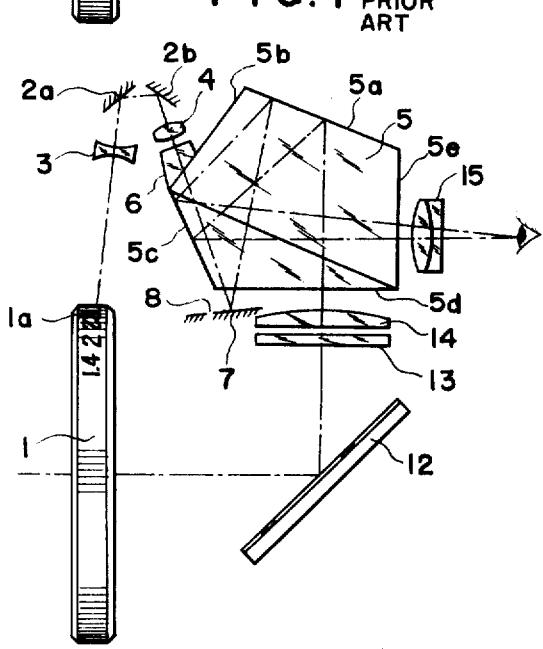
FIG. 3 is a side view showing an optical formation of an embodiment in accordance with the present invention.

In the present invention, as shown in FIG. 3 small prism 6 is mounted onto upper side surface 5b of pentagonal prism 5 facing eyepiece 15, and to project the diaphragm scale 1a on diaphragm setting ring 1 passing through reflectors 2a and 2b from small prism 6 into pentagonal prism 5, an image forming optical system composed of concave lens 3 and convex lens 4 is disposed so as to form an image of diaphragm scale 1a on reflector 7 disposed on the front side of bottom face 5d of pentagonal prism 5 and outside thereof or on the optical axis close thereto. And, light rays from the image forming plane are projected again into pentagonal prism 5 through bottom face 5d thereof and reflected by top face 5a and further reflected by front reflection face 5c, and then reflected from back face 5e to enter eyepiece 15. And, the optical path length thereof is substantially equal to the optical path length along which the objective image on focusing glass 13 is projected from bottom face 5d of pentagonal prism 5 and reflected by the inside surfaces thereof, and enters eyepiece 15 through back face 5e of pentagonal prism 5. In this manner, it is obvious also from the drawings that such a relation as described above can be formed very easily by selecting the focal distance of the lens system 3–4 and the position on the optical axis. The above description relates to the diaphragm scale, however, it is quite the same for the shutter speed scale.

Figure 4:
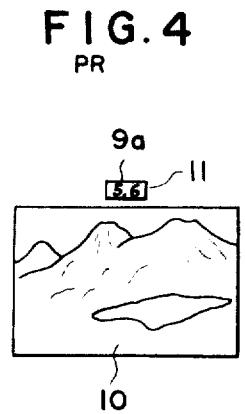
FIG. 4 is a front view of a viewfinder field of the same embodiment.

Besides, in the present invention by forming frame 8 for forming frame image 11 surrounding the exposure adjusting scale image on reflector 7, it is possible to allow the optical path lengths formed between frame 8 and the diaphragm scale image, and focusing plate 13 respectively and eyepiece 15 to coincide and accordingly possible to see clearly these images at the same time through eyepiece 15 as shown in FIG. 4.

In addition, according to the present invention by selecting the focal distance of image forming lenses 3, 4 it is possible to adjust freely the size of the exposure element scale image 9a so as to overcome any difficulty to project the numeral values in the viewfinder field because the image is neither too large or small.

Figure 5:
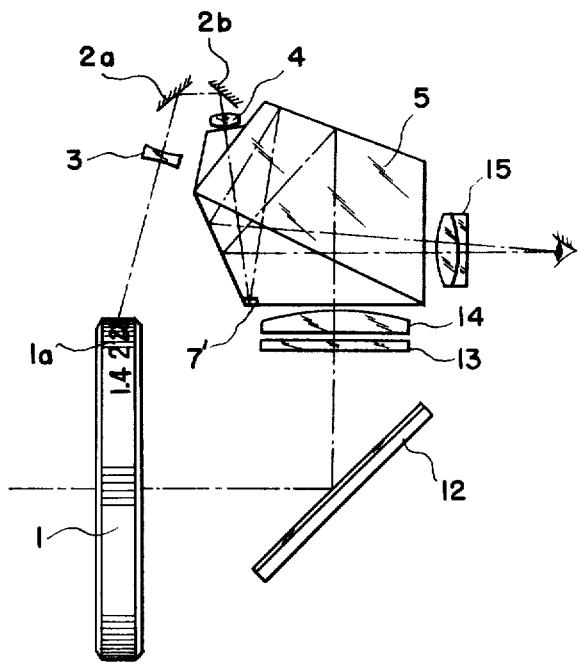
FIG. 5 is a side view showing an optical formation of another embodiment in accordance with the present invention.

In the embodiment shown in FIG. 5, diaphragm scale image 1a is formed on the front side of bottom face 5d of pentagonal prism 5 through image forming lenses 3, 4, and the front side being applied with a vacuum evaporation so as to form reflection face 7'. And, in order to coincide the optical path length for reflection plane 7' exactly the optical design is subject to restrictions, however, it is easy to coincide it approximately, and by doing so there is no necessity of providing reflector 7 so that it is favorable especially for small-sized cameras.

By the way, in both embodiments described above, it is possible to form reflectors 2a, 2b from one prism and also possible to change image forming lenses 3, 4 to a single lens.

What is claimed is:

1. In a single lens reflex camera including a viewfinder having a focusing plate, a pentagonal prism and an eyepiece, and an adjustable setting member having a scale external to the viewfinder, the combination comprising:

optical transmitting means for transmitting an image of the scale to said pentagonal prism, light converging means for forming a real image of said scale through said pentagonal prism at a location which is substantially the same optical distance from said eyepiece as the optical distance from said eyepiece to said focusing plate, reflecting means for directing the real image of said scale to said eyepiece through said pentagonal prism, and said reflecting means is mounted beneath the base face of said pentagonal prism.

2. In a single lens reflex camera including a viewfinder having a focusing plate, a pentagonal prism and an eyepiece, and an adjustable setting member having a scale external to the viewfinder, the combination comprising:

optical transmitting means for transmitting an image of the scale to said pentagonal prism, light converging means for forming a real image of said scale through said pentagonal prism at a location which is substantially the same optical distance from said eyepiece as the optical distance from said eyepiece to said focusing plate, reflecting means for directing the real image of said scale to said eyepiece through said pentagonal prism, and said means for reflecting is a small reflective surface formed on a portion of said base face.

* * * * *